(12) United States Patent
Kotlyar

(10) Patent No.: US 12,539,328 B2
(45) Date of Patent: Feb. 3, 2026

(54) ORAL VACCINE VIA DENTAL BACTERIA AND EMITTED PEPTIDES TO PREVENT COVID-19 INFECTION

(71) Applicant: David Kotlyar, Sterling, VA (US)

(72) Inventor: David Kotlyar, Sterling, VA (US)

( * ) Notice: Subject to any disclaimer, the term of this patent is extended or adjusted under 35 U.S.C. 154(b) by 0 days.

(21) Appl. No.: 18/608,668

(22) Filed: Mar. 18, 2024

(65) Prior Publication Data

US 2024/0226281 A1 Jul. 11, 2024

Related U.S. Application Data

(63) Continuation of application No. PCT/US2022/076681, filed on Sep. 19, 2022.

(60) Provisional application No. 63/245,553, filed on Sep. 17, 2021.

(51) Int. Cl.
*A61K 39/215* (2006.01)
*C07K 4/04* (2006.01)
*A61K 39/00* (2006.01)

(52) U.S. Cl.
CPC ...... *A61K 39/215* (2013.01); *A61K 2039/522* (2013.01); *A61K 2039/523* (2013.01); *A61K 2039/542* (2013.01); *A61K 2039/543* (2013.01)

(58) Field of Classification Search
None
See application file for complete search history.

(56) References Cited

U.S. PATENT DOCUMENTS

| 10,973,908 | B1 | 4/2021 | Bermudes |
| 2017/0333493 | A1 | 11/2017 | Ahmer et al. |

FOREIGN PATENT DOCUMENTS

| WO | 2020018935 A2 | 1/2020 |
| WO | 2021173879 A1 | 9/2021 |

OTHER PUBLICATIONS

Cao et al. De novo design of picomolar SARS-CoV-2 miniprotein inhibitors. Science 370, 426-431 (2020).*
Schuster, et al., Use of the counter selectable marker PheS* for genome engineering in *Staphylococcus aureus*, Microbiology Society, 2019, 572-584, 165.
Xia, et al., Inhibition of SARS-CoV-2 (previously 2019-nCoV) infection by a highly potent pan-coronavirus fusion inhibitor targeting its spike protein that harbors a high capacity to mediate membrane fusion, Cell Research, 2020, 343-355, 30.
Cao et al., De novo design of picomolar SARS-CoV-2 miniprotein inhibitors, Science, 2020, 426-431, 370.
Xiang et al., Recent advances in developing small-molecule inhibitors against SARS-CoV-2, Acta Pharmaceutica Sinica B, 2021.
Chitsike et al., Keep out! SARS-CoV-2 entry inhibitors: their role and utility as COVID-19 therapeutics, Virology Journal, 2021, 18, 154.
Han et al., Computational Design of ACE2-Based Peptide Inhibitors of SARS-CoV-2, ACS NANO, 2020, 5143-5147, 14.
Maiti, Potential Role of Peptide-Based Antiviral Therapy Against SARSCoV-2 Infection, ACS Pharmacology and Translational Science, 2020, 783-785, 3.
Chevalier, et al., Massively parallel de novo protein design for targeted therapeutics, Nature, 2017, 74-95, 550.

* cited by examiner

*Primary Examiner* — Nianxiang Zou

(57) ABSTRACT

Disclosed is a pharmaceutical composition to prevent transmission of severe acute respiratory syndrome coronavirus 2 (SARS-CoV-2), the pharmaceutical composition comprising: genetically modified bacteria; sequences of small peptides; and pharmaceutical excipients, wherein the genetically modified oral bacteria are modified to translate, produce, and emit the sequences of small peptides which neutralize SARS-CoV-2 against COVID-19, wherein transgenic technology is used to modify the genetically modified oral bacteria to add genes in genetically modified oral bacteria that are transcribed to produce small peptides from the sequences of small peptides so added, wherein the sequences of small peptides show extreme binding and neutralization to SARS-CoV-2 but not to host proteins or processes, and wherein the pharmaceutical excipients aid the oral and/or nasal administration of the pharmaceutical composition.

11 Claims, 7 Drawing Sheets

Specification includes a Sequence Listing.

FIG. 2B

| Small peptide | Sequence |
|---|---|
| AHB1 | SEQ ID NO: 1<br>DEDLEELERLYRKAEEVAKEAKDASRRGDDERAKEQMERAMRLDQVFE-LAQELQEKQIDGNRQKATHLDKAVKEAADELYQRVR |
| AHB2 | SEQ ID NO: 2<br>ELEEQVMHVLDQVSELAHELLHKL TGEELERAA YFNWWATEMMLELIK-SDDEREIREIEEEARRILEHLEELARK |
| LCB1 | SEQ ID NO: 3<br>DKEWIL QKIYEIMRLL DEL GHAEASMRVSDLIYEFMK KGDERLLEEAER-LL EEVER |
| LCB2 | SEQ ID NO: 4<br>SDDEDSVRYLL YMAEL RYEQGNPEKAKKIL EMAEFIAKRNNNEELERL V-REVKKRL |
| LCB3 | SEQ ID NO: 5<br>NDDEL HMLMTDLVYEALHFAKDEEIKKR VFQL FEL ADKA YKNNDROK-LEKVVEELKELLERLLS |
| LCB4 | SEQ ID NO: 6<br>QREKRLKQL EMLLE YAIERNDPYLMFDVA VEML RLAEENNDERIIERAK-RILEEYE |
| LCB5 | SEQ ID NO: 7<br>SLEELKEQVKELKKELSPEMRRLIEEALRFLEEGNP AMAMMVLSDL VY Q-LGDPRVIDL YML VTKT |
| LCB6 | SEQ ID NO: 8<br>DREQRL VRFL VRLA SKFNL SPEQIL QLFEVLEELLERGVSEEEIRKQLEEV-AKELG |
| LCB7 | SEQ ID NO: 9<br>DDDIRYLIYMAKLRLEQGNPEEAEK VLEMARFLAERL GMEELLKEVRELL-RKIEELR |
| LCB8 | SEQ ID NO: 10<br>PIIELLREAKEKNDEFAISDAL YL VNELLQRTGDPRLEEVL YLIWRALKEK-DPRLLDRAIELFER |

FIG. 3

Genes encoding the designed peptide sequences as set forth in SEQ ID NO: 1 to SEQ ID NO: 10 will be synthesized and cloned into modified pET-29b(+) E. coli plasmid

↓

Aforementioned plasmids will then be transformed into *Staphylococcus lugdunensis* and/or *Streptococcus salivarius M18*

↓

Protein expression of the small peptides the group consisting of sequences as set forth in SEQ ID NO: 1 to SEQ ID NO: 10 which encode peptides AHB1, AHB2, and LCB1 to LCB8, respectively will be induced appropriately.

Then the bacterial cells would be centrifuged and lysed using sonicators to obtain a clarified soluble fraction with the expressed peptides after centrifugation.

↓

Peptides in the soluble fraction will be evaluated to check if the genetically modified bacteria of the present disclosure are expressing and emitting the sequences of small peptides of the present disclosure as set forth in SEQ ID NO: 1 to SEQ ID NO:10 by means of affinity purification, size exclusion chromatography, SDS-PAGE characterization as well as determining the protein concentration by spectrophotometer

FIG. 4

Genetically modified Staphylococcus lugdunensis and/or Streptococcus salivarius M18 transformed with plasmids for expression of SEQ ID NO: 1 to SEQ ID NO: 10

↓

Viral stocks with SARS-CoV-2 strain will be produced in Vero CCL81 cells and titrated by focys forming assay on Vero E6 cells

↓

Serial dilutions of the genetically modified Staphylococcus lugdunensis and/or Streptococcus salivarius M18 expressing the sequences of small peptides of the present disclosure as set forth in SEQ ID NO: 1 to SEQ ID NO: 10 will be incubated with the 10^2 focus forming units (FFU) of SARS-CoV-2

↓

Vero E6 cell monolayer in 96-well plates will be used to assay SARS-CoV-2-infected cell foci and/or SARS-CoV-2 neutralization

FIG. 5

ORAL VACCINE VIA DENTAL BACTERIA AND EMITTED PEPTIDES TO PREVENT COVID-19 INFECTION

CROSS REFERENCE TO RELATED APPLICATIONS

The current application is a continuation application of the Patent Cooperation Treaty (PCT) application PCT/US2022/076681, which was filed on Sep. 19, 2022, while Sep. 17, 2022 was on a weekend. The PCT application PCT/US2022/076681 also claims benefit of the U.S. Provisional Patent Application 63/245,553 filed Sep. 17, 2021. The current application is filed on Mar. 18, 2024, while Mar. 17, 2024 was on a weekend.

FIELD OF THE INVENTION

The present invention generally relates to pharmaceutical compositions of a vaccine for oral and/or nasally administration. The present invention particularly relates to the said vaccine to prevent the transmission of severe acute respiratory syndrome coronavirus 2 (SARS-COV-2). More specifically, the present invention provides the said oral and/or nasally administered vaccine that incorporates certain genetically modified bacteria to emit and/or translate protective molecules which neutralize SARS-COV-2.

SEQUENCE LISTING

The instant application contains a Sequence Listing which has been submitted electronically in ASCII format and is hereby incorporated by reference in its entirety. Said ASCII copy, created on Sep. 19, 2022 is named TPC70987 SEQ LIST_ST25.txt and is 6,689 bytes in size.

BACKGROUND OF THE INVENTION

In 2019, a new infectious respiratory disease emerged. A novel coronavirus was identified as the pathogen causing the outbreak of atypical pneumonia and given a nomenclature of 2019 novel coronavirus (2019-nCoV) by the World Health Organization (WHO). The International Committee on Taxonomy of Viruses (ICTV) renamed the virus as severe acute respiratory syndrome coronavirus-2 (SARS-CoV-2) and the disease a coronavirus disease 2019 (COVID-19). SARS-CoV-2 belongs to the genus betacoronavirus, together with SARS-CoV and Middle East respiratory syndrome coronavirus (MERS-CoV, with 82% and 50% homology, respectively). The main symptoms of COVID-19 include fever, fatigue, dry cough, upper chest discomfort and dyspnea. Severe cases are reported to show sepsis, secondary infections and organ failure. As per WHO webpage, there are 608,328,548 confirmed cases worldwide of COVID-19, and 6,501,469 confirmed deaths globally from the COVID-19 pandemic as of 16 Sep. 2022 (https://www.who.int/emergencies/diseases/novel-coronavirus-2019). On 30 Jan. 2020, WHO declared the COVID-19 outbreak to be a global public health emergency, and on 11 Mar. 2020, WHO characterized COVID-19 as a pandemic.

SARS-CoV-2 infection generally begins in the nasal cavity, with virus replicating there for several days before spreading to the lower respiratory tract. A schematic diagram of the particle structure of SARS-CoV-2 particle is provided in FIG. 1A, and a schematic illustration of the lifecycle of SARS-CoV-2 is provided in FIG. 1B. Delivery of a high concentration of a viral inhibitor into the nose and into the respiratory system generally might therefore provide prophylactic protection and/or therapeutic benefit for treatment of early infection and could be particularly useful for healthcare workers and others coming into frequent contact with infected individuals.

Although, a number of monoclonal antibodies are in development as systemic treatments for COVID-19, but these proteins are not ideal for intranasal delivery because antibodies are large and often not extremely stable molecules, and the density of binding sites is low (two per 150 KDa antibody); antibody-dependent disease enhancement is also a potential issue. High-affinity spike protein binders that block the interaction with the human cellular receptor angiotensin-converting enzyme 2 (ACE2) with enhanced stability and smaller sizes to maximize the density of inhibitory domains could have advantages over antibodies for direct delivery into the respiratory system through intranasal administration, nebulization, or dry powder aerosol. Such peptide binders or peptide antiviral mode of action is schematically presented in FIG. 2A. In A. Chevalier et al. intranasal delivery of small proteins designed to bind tightly to the influenza hemagglutinin has been shown to provide both prophylactic and therapeutic protection in rodent models of lethal influenza infection. In a follow-up, Cao et al. investigated the capacity of AHB1 (set forth as SEQ ID NO: 1 herein), AHB2 (set forth as SEQ ID NO: 2 herein), and LCB1 to LCB5 (set forth as SEQ ID NO: 3 to SEQ ID NO: 7 herein) to prevent the infection of cells by bona fide SARS-CoV-2. FIG. 2B provides the import of such a technique and strategy as used in the present disclosure to neutralize and prevent transmission of SARS-CoV-2.

The primary cause of SARS-CoV-2 infection is the crosstalk between the SARS-CoV-2 and host surface receptor protein, human angiotensin-converting enzyme 2 (ACE2), prior to cellular entry. Hence, blocking at the initial stage of virus entry could be a promising strategy/therapy to combat the SARS-CoV-2 infection and one such strategy involves peptide-based antivirals. As envisioned in Maiti peptide-based antivirals may reduce virus load into the host cell by blocking cellular surface receptors and/or disruption of virus cell membrane at the stage of virus entry, which presents a promising therapeutic route for prevention of COVID-19. In this reference, which is incorporated herein by reference, it was proposed that a designed peptide that mimics the virus binding domain of ACE2, would be a promising SARS-CoV-2 blocker. The underlying strategy provided involves amputation of the full length of ACE2 that specifically binds the spike protein.

Further, in a review by Chitsike and Duerksen-Hughes, it was seen with the highlighted studies therein that therapeutic strategies involving various viral entry inhibitors such as multivalent antibodies, recombinant ACE2 and miniproteins can be effective not only for pre-exposure prophylaxis, but also in protecting against SARS-CoV-2 antigenic drift and future zoonotic sarbecoviruses, which are incorporated herein by reference.

Aforementioned mechanism of targeting the interaction between the SARS-CoV-2 spike (S) protein and ACE2 receptor as a promising therapeutic strategy was further elaborated on in a reference Cao et al., which is incorporated herein by reference, and where computer-generated scaffolds were either built around an ACE2 helix that interacts with the spike receptor binding domain (RBD) or docked against the RBD to identify new binding modes, and their amino acid sequences were designed to optimize target binding, folding, and stability. Ten designs bound the RBD, with affinities ranging from 100 picomolar to 10 nanomolar, and blocked SARS-CoV-2 infection of Vero E6 cells with median inhibitory concentration (IC50) values between 24 picomolar and 35 nanomolar. The most potent, with new binding modes, were 56- and 64-residue proteins (IC50~0.16 nanograms per milliliter). Cryo-electron microscopy structures of these minibinders in complex with the SARS-CoV-2 spike ectodomain trimer with all three RBDs bound are nearly identical to the computational models. These hyperstable minibinders provided starting points for SARS-CoV-2 therapeutics.

Peptides to disrupt SARS-CoV-2-RBD binding to ACE2 can inhibit the virus which target the stage of viral attachment to prevent entry to host cells, a new modality for COVID-19 therapeutic intervention. For example, SBP1 (a 23-mer peptide fragment) consisting of amino acids in the α1 helix of the ACE2 peptidase domain (PD) was synthesized. The results of bio-layer interferometry revealed that SBP1 could specifically bind with SARS-CoV-2-RBD in low nanomolar concentration, and block the interaction between SARS-CoV-2 S protein and ACE2, thereby preventing the virus from entering host cells and providing a new treatment and diagnostic strategy against COVID-19. To inhibit the viral attachment between S protein and ACE2, the peptides designed by Cao et al. using two de novo design approaches, also known as minibinders, were either built around an ACE2 helix or based on RBD-binding motifs. AHB1 (referred here as SEQ ID NO: 1) and AHB2 (referred here as SEQ ID NO: 2) followed the first approach, exhibited strongly neutralization SARS-CoV-2 with IC50s of 35 and 15.5 nmol/L, respectively. Using the second approach, LCB1 (referred here as SEQ ID NO: 3), and LCB3 (referred here as SEQ ID NO: 5), neutralized SARS-CoV-2 with IC50s of 23.54 and 48.1 pmol/L, respectively. These hyperstable minibinders provide new approaches for SARS-CoV-2 therapeutics.

It was further observed that the interface residues on the RBD of the S protein of SARS-Cov-2 making contacts with ACE2 and with the de novo binders are similar and in the vicinity of the RBD-ACE2 interaction and contact (refer to table S1 of Cao et al.), incorporated herein as reference). The sequences of small peptides as used herein and presented in a tabular form in FIG. 3 of the present disclosure for the aforementioned de novo binders are as set forth in SEQ ID NO: 1 for AHB1 (i.e., DEDLEELERLYRKAEEVAKEAK-DASRRGDDERAKEQMERAMRL DQVFELAQEL-QEKQTDGNRQKATHLDKAVKE AADELYQRVR), SEQ ID NO: 2 for AHB2 (i.e., ELEEQVMHVLDQVSELA-HELLHKLTGEELERAAYFNWWATEMMLELIKSD-DEREIR EIEEEARRILEHLEELARK), SEQ ID NO: 3 for LCB1 (i.e., DKEWILQKIYEIMRLLDELGHAEASMR-VSDLIYEFMKKGDERLLEEAERLLEEVER), SEQ ID NO: 4 for LCB2 (i.e., SDDEDSVRYLLYMAELRYEQGN-PEKAKKILEMAEFIAKRNNNEELERLVREVKKRL), SEQ ID NO: 5 for LCB3 (i.e., NDDELHMLMTDLV-YEALHFAKDEEIKKRVFQLFELADKAYKNNDRQK-LEKVVEEL KELLERLLS), SEQ ID NO: 6 for LCB4 (i.e., QREKRLKQLEMLLEYAIERNDPYLMFDVAVEMLR-LAEENNDERIIERAKRILEEYE), SEQ ID NO: 7 for LCB5 (i.e., SLEELKEQVKELKKELSPEMRRLIEE-ALRFLEEGNPAMAMMVLSDLVYQLGDPRVID LYML-VTKT), SEQ ID NO: 8 for LCB6 (i.e., DREQRLVRFLVR-LASKFNLSPEQILQLFEVLEELLERGVSEEEIRKQLE-EVAKELG), SEQ ID NO: 9 for LCB7 (i.e., DDDIRYLIY-MAKLRLEQGNPEEAEKVLEMARFLAERLGMEELLKEV-RELLRKIEELR), and SEQ ID NO: 10 for LCB8 (i.e., PIIELLREAKEKNDEFAISDALYLVNELLQRTGDPR-LEEVLYLIWRALKEKDPRLLDR AIELFER). These sequences of small peptides as used herein for the aforementioned de novo binders, where AHB2 and LCB1-LCB8 were expressed and purified from E. coli, and binding to the RBD assessed with BLI as seen in Cao et al. For seven of the designs, the dissociation constant (Kd) values ranged from 1 to 20 nM, and for two (LCB1 and LCB3), the Kd values were below 1 nM, which is too strong to measure reliably with this technique as shown in Cao et al. Thus, as seen with the FIG. 5 therein in Cao et al. incorporated herein as reference, on a per mass basis, because of their very small size, the designs are sixfold more potent than the best monoclonal antibodies and thus, have potential advantages over antibodies as potential therapeutics. However, there still remains questions and need for proper administration of these potential small peptides for neutralization of SARS-Cov-2 which is effective and easy to administer.

The present invention provides pharmaceutical compositions comprising and based on genetically modified bacteria which are capable of being nasally and orally applied so as to provide effective transmission of therapeutically effective amounts of the aforementioned sequences of small peptides as set forth in SEQ ID NO: 1 to SEQ ID NO: 10, which are added into the genetically modified bacteria, which they transcribe, translate, produce, and emit as de novo binders as described hereinabove so as to prevent transmission SARS-CoV-2 against COVID-19 owing to their extreme binding and neutralization of SARS-Cov-2, with the advantage of the disclosed pharmaceutical compositions being given as oral vaccine or as a nasal spray vaccine allowing neutralization of SARS-Cov-2 and prevention of its transmission right at the entry stages in the nasal cavities itself. Advantageously, the present invention addresses the need and gap in the art as to effective administration, neutralization and prevention of transmission of SARS-CoV-2 by providing a vaccine that can be orally and/or nasally administered by incorporating certain genetically modified bacteria that emit and/or translate protective molecules, i.e., the presently disclosed sequences of small peptides as set forth in SEQ ID NO: 1 to SEQ ID NO: 10, which neutralize SARS-CoV-2 on a biophysics order of magnitude higher than what can be achieved via traditional adaptive immunological means. Use of such a combination of oral and/or nasally administered genetically modified bacteria carrying the therapeutically effective neutralizing sequences of small peptides, it becomes statistically impossible for variants to mutate and develop resistance against such a vaccine.

SUMMARY OF THE INVENTION

The present disclosure provides a pharmaceutical composition which is an oral or nasal spray vaccine to prevent transmission of SARS-CoV-2. The present invention provides said oral or nasal spray vaccine that incorporates certain genetically modified oral bacteria to emit and/or translate protective molecules which neutralize SARS-CoV-2 on a biophysics order of magnitude higher than can be achieved via traditional adaptive immunological means. Using a combination of said genetically modified oral bacteria and protective molecules which are small peptide antivirals, it becomes statistically impossible for variants to mutate and develop resistance against the vaccine. In the present disclosure, the combination obtained by the genetically modified oral bacteria and protective molecules which are sequences of peptides that show extreme binding and neutralization to SARS-CoV-2 (not possible with traditional adaptive immunity), and not to host proteins or processes. The preferred bacteria of the present disclosure are nasal and orally applied transgenic *Staphylococcus lugdunensis*, and/or *Streptococcus salivarius* M18.

In an embodiment of the present invention, a pharmaceutical composition to prevent transmission of severe acute respiratory syndrome coronavirus 2 (SARS-CoV-2) is disclosed, the pharmaceutical composition comprising: a) genetically modified bacteria; b) sequences of small peptides; and c) pharmaceutical excipients, wherein the genetically modified oral bacteria are modified to translate, produce, and emit the sequences of small peptides which neutralize SARS-CoV-2 against COVID-19, wherein transgenic technology is used to modify the genetically modified oral bacteria to add genes in genetically modified oral bacteria that are transcribed to produce small peptides from the sequences of small peptides so added, wherein the sequences of small peptides show extreme binding and neutralization to SARS-CoV-2 but not to host proteins or processes, and wherein the pharmaceutical excipients aid the oral and/or nasal administration of the pharmaceutical composition.

In an embodiment of the present invention, a method of treating or preventing SAR-CoV-2 infection in a subject against COVID-19 is disclosed, the method comprising administering to the subject a therapeutically effective amount of one or more genetically modified bacteria.

In an embodiment of the present invention, a method of blocking SAR-CoV-2 virus entry in a subject is disclosed, comprising administering to the subject a therapeutically effective amount of one or more genetically modified bacteria.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings are included to provide a further understanding of the invention, and are incorporated in and constitute a part of the present invention and, together with the description, serve to explain the principle of the invention. In the drawings:

Figure 2B:
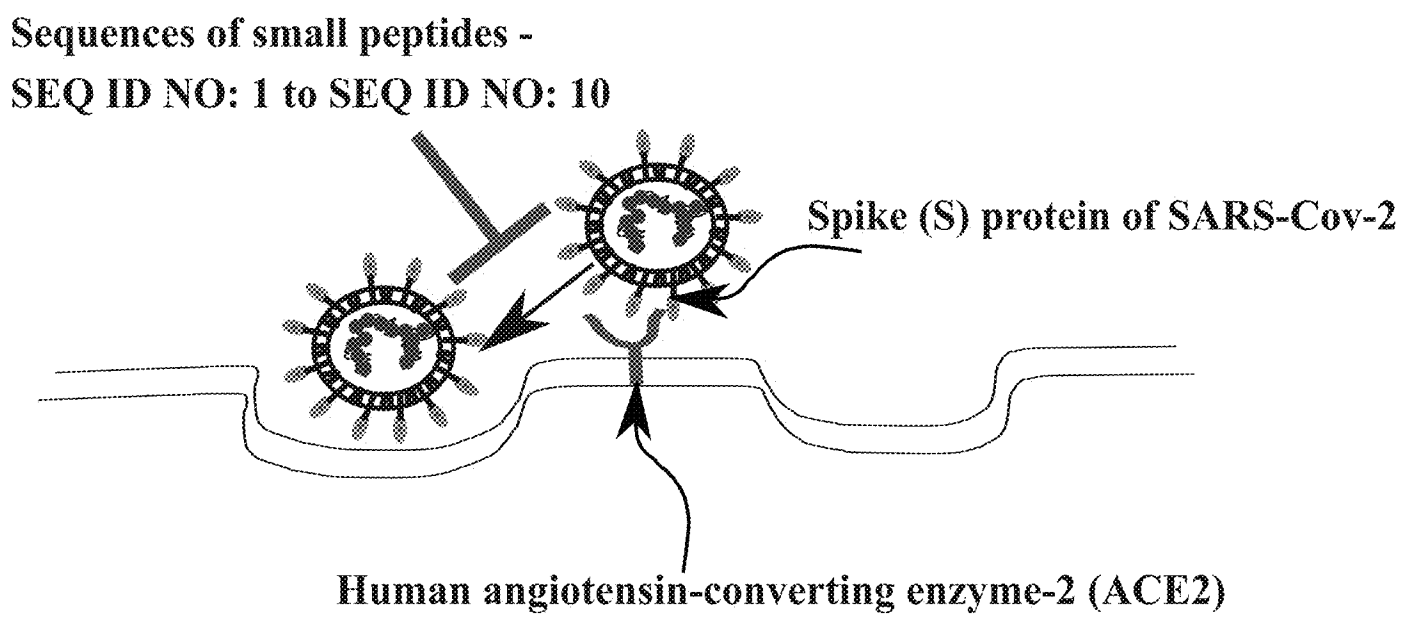

FIG. 2B provides one such mechanism that is used in the present disclosure with the use of sequences of small peptides as set forth in SEQ ID NO: 1 to SEQ ID NO: 10 to block and neutralize human angiotensin-converting enzyme-2 (ACE2) and Spike protein (S) of SARS-Cov-2.

FIG. 3 provides the sequence for SEQ ID NO: 1 to SEQ ID NO: 10 for the small peptides of the present disclosure corresponding respectively to AHB1, AHB2, LCB1 to LCB8.

FIG. 4 provides a schematic flow-chart of a planned experiment and embodiment of the present invention to demonstrate that the genetically modified bacteria of the present disclosure do in fact emit the small peptides of sequences as set forth in SEQ ID NO: 1 to SEQ ID NO: 10 at a concentration that is considered effective towards binding and blocking activity of the SARS-CoV-2 virus.

FIG. 5 provides a schematic flow-chart of a planned experiment and embodiment of the present invention to demonstrate in vitro that the genetically modified bacteria of the present disclosure expressing and emitting small peptides of sequences as set forth in SEQ ID NO: 1 to SEQ ID NO: 10 in fact cause down-regulation of infection of cultured human Vero cells showing SARS-CoV-2 neutralization through this assay.

DETAILED DESCRIPTION OF THE INVENTION

Figure 1A:
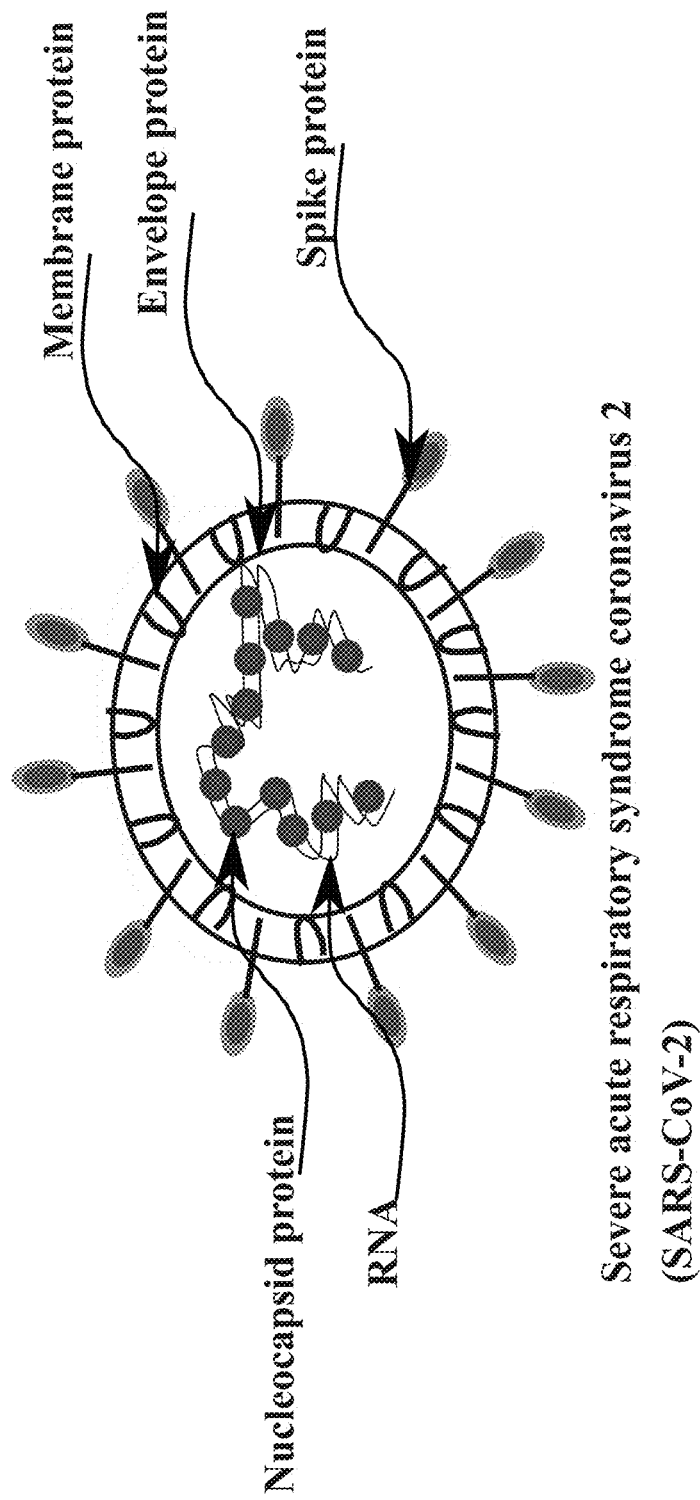
FIG. 1A provides a cartoon representation of the viral particle structure of the SARS-CoV-2 virus, which is an enveloped virus with a positive-sense, single stranded RNA [(+) ssRNA] genome of ~30 kb, along with the Nucleocapsid proteins (N), and the structural proteins on the surface of the viral particle include Spike protein (S), Envelope protein (E), Membrane protein (M) as shown in the representation.
Figure 1B:
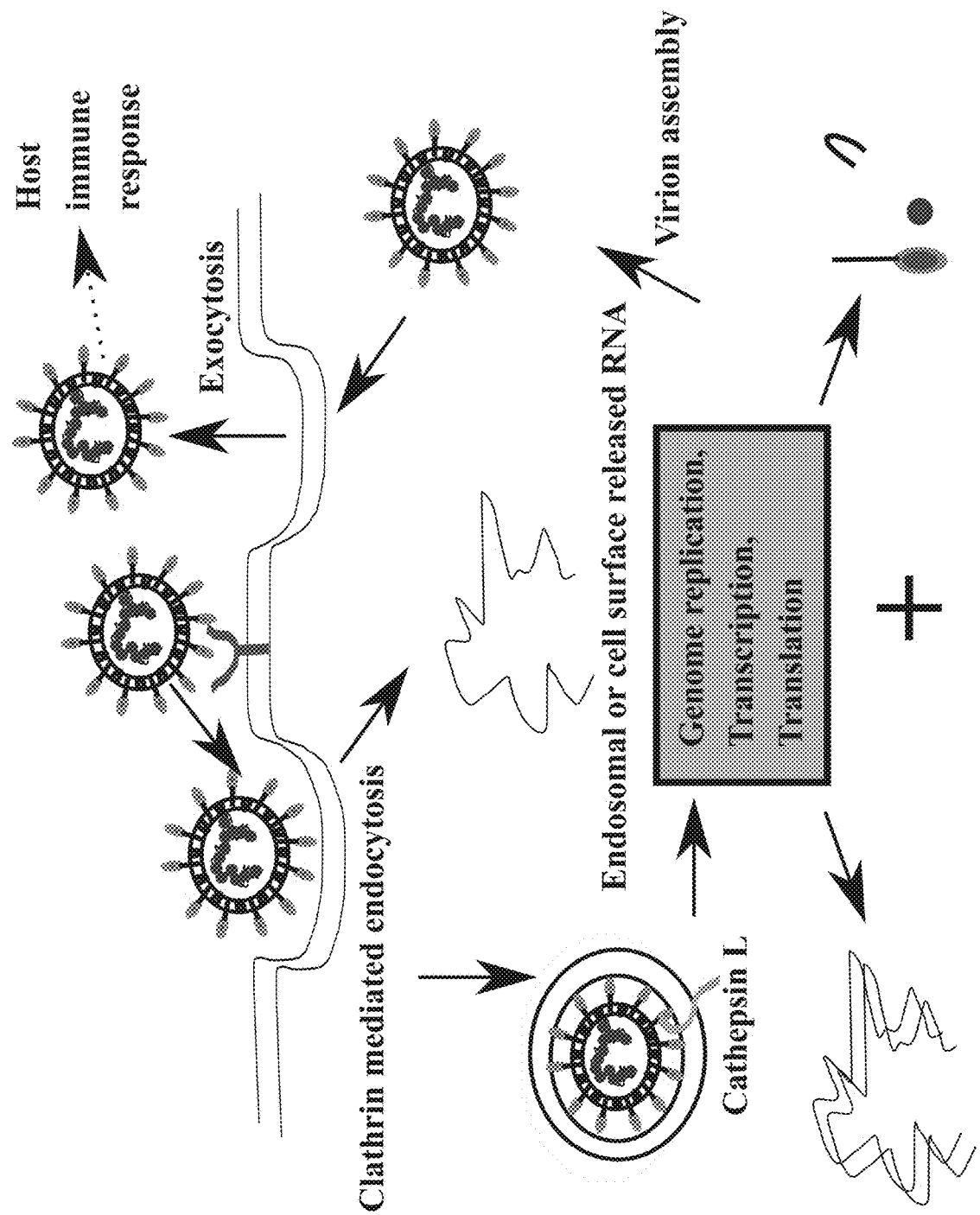
FIG. 1B provides a schematic of the life cycle of SARS-CoV-2 at the respiratory epithelial cell surface, where SARS-CoV-2 first binds to ACE2 on the cell surface and then releases RNA into the cytosol from the endosome following endocytosis and cathepsin activation, or directly from the cell surface membrane following S activation by proteases. In the cytosol of the host cells, the (+) genomic RNA is directly translated from the ORF1a/b into polyproteins containing non-structural proteins of the complex replicase machinery (e.g., RdRp). (−) sense RNA is synthesized and becomes a template for (+) sense genomic RNA and sub-genomic RNA from which structural proteins and accessory proteins are made. These proteins and the genomic RNA will be utilized to assemble new virions that will exit the cell via exocytosis. The virions and the death of infected cell will induce immune response from the host.
Figure 2A:
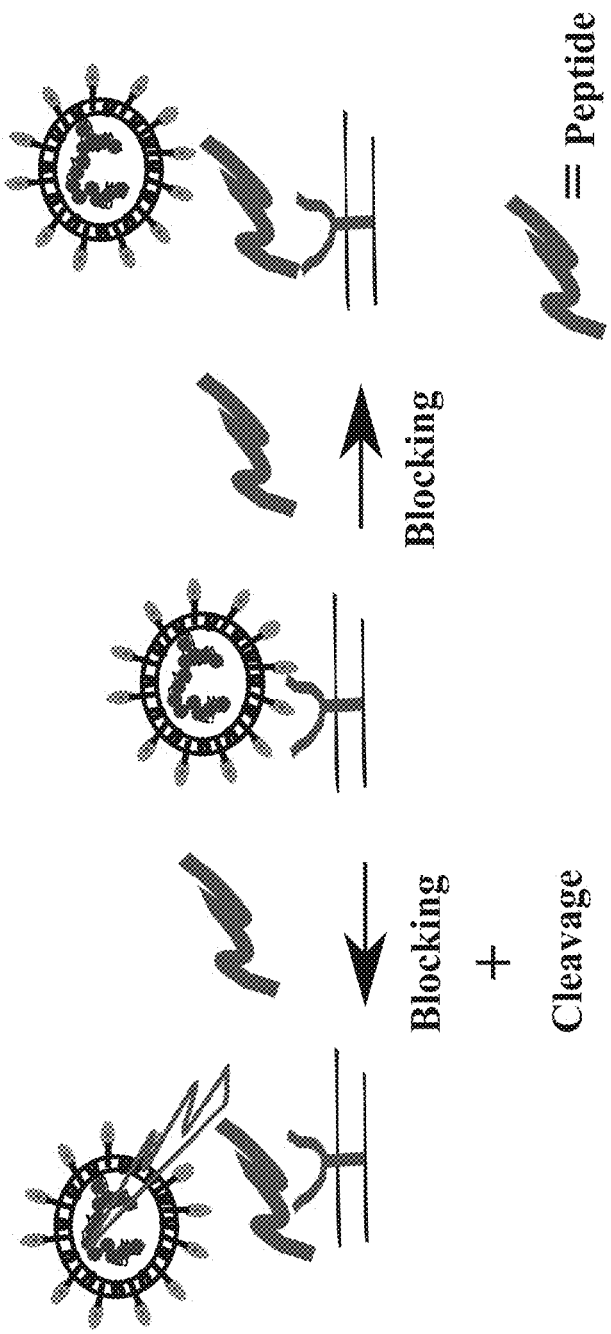
FIG. 2A provides a schematic for the peptide-based antivirals against SARS-CoV-2, where two kinds of prevention of SARS-CoV-2 infection are probable, where a designed peptide that mimics the interface of virus binding domain of angiotensin-converting enzyme-2 (ACE2) may reduce virus load into the host cell by blocking cellular surface receptors and/or disruption of virus cell membrane at the stage of virus entry.

The present invention may be understood more readily by reference to the following detailed description of the invention taken in connection with the accompanying drawing figures, which forms a part of this disclosure. It is to be understood that this invention is not limited to the specific devices, medicines, systems, conditions or parameters described and/or shown herein and that the terminology used herein is for the example only, and is not intended to be limiting of the claimed invention. Also, as used in the specification including the appended claims, the singular forms 'a', 'an', and 'the' include the plural, and references to a particular numerical value includes at least that particular value unless the content clearly directs otherwise. Ranges may be expressed herein as from 'about' or 'approximately' another particular value. When such a range is expressed it is another embodiment. Also, it will be understood that unless otherwise indicated, dimensions and material characteristics stated herein are by way of example rather than limitation, and are for better understanding of sample embodiment of suitable utility, and variations outside of the stated values may also be within the scope of the invention depending upon the particular application.

The terms "comprising," "having," "including," and "containing" are to be construed as open-ended terms (i.e., meaning "including, but not limited to," and permit the presence of one or more features or components) unless otherwise noted. It should be understood that while various embodiments in the specification are presented using "comprising" language, under various circumstances, a related embodiment may also be described using "consisting of" or "consisting essentially of" language. As such, the terms "a" (or "an"), "one or more," and "at least one" can be used interchangeably herein. Furthermore, "and/or" where used herein is to be taken as specific disclosure of each of the two specified features or components with or without the other.

It should also be understood that when describing a range of values, the characteristic being described could be an individual value found within the range. For example, "a pH from about pH 4 to about pH 6," could be, but is not limited to, pH 4, 4.2, 4.6, 5.1, 5.5, etc. and any value in between such values. Additionally, "a pH from about pH 4 to about pH 6," should not be construed to mean that the pH of a formulation in question varies 2 pH units in the range from pH 4 to pH 6 during storage, but rather a value may be picked in that range for the pH of the solution, and the pH remains buffered at about that pH. In some embodiments, when the term "about" is used, it means the recited number plus or minus 10% of that recited number.

In any of the ranges described herein, the endpoints of the range are included in the range. However, the description also contemplates the same ranges in which the lower and/or the higher endpoint is excluded. Additional features and variations of the invention will be apparent to those skilled in tire art from the entirety of this application, including the drawing and detailed description, and all such features are intended as aspects of the invention. Likewise, features of the invention described herein can be re-combined into additional embodiments that also are intended as aspects of the invention, irrespective of whether the combination of features is specifically mentioned above as an aspect or embodiment of the invention. Also, only such limitations which are described herein as critical to the invention should be viewed as such; variations of the invention lacking limitations which have not been described herein as critical are intended as aspects of the invention.

Unless defined otherwise, all technical and scientific terms used herein have the same meaning as commonly understood by one of ordinary skill in the art to which this disclosure is related.

Units, prefixes, and symbols are denoted in their Systems International de Unites (SI) accepted form. Numeric ranges are inclusive of the numbers defining the range. Unless otherwise indicated, amino acid sequences are written left to right in amino to carboxy orientation. The headings provided herein are not limitations of the various aspects or aspects of the disclosure, which can be had by reference to the specification as a whole. The entire document is intended to be viewed as a unified disclosure, and it should be understood that all combinations of features described herein are contemplated.

All references cited herein are hereby incorporated by reference in their entireties.

Embodiments will now be described in details with reference to the accompanying drawings. To avoid unnecessarily obscuring in the present disclosure, well-known features may not be described, or substantially the same elements may not be redundantly described, for example. This is for case of understanding. The drawings and the following description are provided to enable those skilled in the art to fully understand the present disclosure and are in no way intended to limit the scope of the present disclosure as set forth in the appended claims.

A general concept underlying the present invention is the creation and use of created transgenic bacteria consisting of the following species: *Staphylococcus lugdunensis*, and/or *Streptococcus salivarius* M18 nasal and oral application in a pharmaceutical composition as an oral or a nasal spray vaccine for delivery and administration of protective small peptide antivirals that show extreme binding and neutralization to SARS-CoV-2 but not to host proteins or processes and which neutralize SARS-CoV-2 on a biophysics order of magnitude higher than can be achieved via traditional adaptive immunological means so as to prevent transmission of SARS-CoV-2. Further, the present disclosure is advantageous in showing synergistic effect with the use of a combination of said genetically modified oral bacteria and protective molecules which are small peptide antivirals, with which it becomes statistically impossible for variants to mutate and develop resistance against the vaccine. In the present disclosure, the preferred bacteria of the present disclosure are nasal and orally applied transgenic *Staphylococcus lugdunensis*, and/or *Streptococcus salivarius* M18, but can also include all potential commensal bacteria in the mouth and nose that could deliver these peptides.

In accordance with one embodiment of the present invention, it discloses a pharmaceutical composition to prevent transmission of severe acute respiratory syndrome coronavirus 2 (SARS-CoV-2), the pharmaceutical composition comprising:
  a) genetically modified bacteria;
  b) sequences of small peptides; and
  c) pharmaceutical excipients,
wherein the genetically modified oral bacteria are modified to translate, produce, and emit the sequences of small peptides which neutralize SARS-CoV-2 against COVID-19, wherein transgenic technology is used to modify the genetically modified oral bacteria to add genes in genetically modified oral bacteria that are transcribed to produce small peptides from the sequences of small peptides so added, wherein the sequences of small peptides show extreme binding and neutralization to SARS-CoV-2 but not to host proteins or processes, and wherein the pharmaceutical excipients aid the oral and/or nasal administration of the pharmaceutical composition.

In another embodiment of the present invention, it discloses the pharmaceutical composition to prevent transmission of severe acute respiratory syndrome coronavirus 2 (SARS-CoV-2), wherein the genetically modified bacteria are the nasally and orally applied transgenic bacteria, *S. lugdunensis*, or *S. salivarius* M18, or a combination thereof.

In another embodiment of the present invention, it discloses the pharmaceutical composition to prevent transmission of severe acute respiratory syndrome coronavirus 2 (SARS-CoV-2), wherein the pharmaceutical composition is an oral vaccine to prevent transmission of SARS-COV-2 or a nasal spray vaccine to prevent transmission of SARS-COV-2.

In another embodiment of the present invention, it discloses the pharmaceutical composition to prevent transmission of severe acute respiratory syndrome coronavirus 2 (SARS-CoV-2), wherein the sequences of small peptides are selected from a group consisting of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, and SEQ ID NO: 10.

In another embodiment of the present invention, it discloses the pharmaceutical composition to prevent transmission of severe acute respiratory syndrome coronavirus 2 (SARS-CoV-2), wherein one or more of the sequences of small peptides are modified with extra n-glycosylation sites to improve half-life.

In another embodiment of the present invention, it discloses the pharmaceutical composition to prevent transmission of severe acute respiratory syndrome coronavirus 2 (SARS-CoV-2), wherein the sequences of small peptides can ablate and/or eliminate genetically modified bacteria via 4 suicide genes for SARS-COV-2.

In another embodiment of the present invention, it discloses the pharmaceutical composition to prevent transmission of severe acute respiratory syndrome coronavirus 2 (SARS-CoV-2), wherein the genetically modified bacteria can include all potential commensal bacteria in the mouth and nose which can be modified to translate, produce, and emit the sequences of small peptides which neutralize SARS-CoV-2 against COVID-19.

In one embodiment of the present invention, it discloses a method of treating or preventing SAR-CoV-2 infection in a subject against COVID-19, the method comprising administering to the subject a therapeutically effective amount of one or more genetically modified bacteria.

In another embodiment of the present invention, it discloses the method of treating or preventing SAR-CoV-2 infection in a subject against COVID-19, wherein the therapeutically effective amount of one or more genetically modified bacteria is administered as an oral vaccine to prevent transmission of SARS-COV-2 or a nasal spray vaccine to prevent transmission of SARS-COV-2.

In another embodiment of the present invention, it discloses the method of treating or preventing SAR-CoV-2 infection in a subject against COVID-19, wherein the subject is a mammal, and preferably the subject is a human.

In one embodiment of the present invention, it discloses a method of blocking SAR-CoV-2 virus entry in a subject comprising administering to the subject a therapeutically effective amount of one or more genetically modified bacteria.

In another embodiment of the present invention, it discloses a method of blocking SAR-CoV-2 virus entry in a subject, wherein the therapeutically effective amount of one or more genetically modified bacteria is administered as an oral vaccine to prevent transmission of SARS-COV-2 or a nasal spray vaccine to prevent transmission of SARS-COV-2.

In another embodiment of the present invention, it discloses a method of blocking SAR-CoV-2 virus entry in a subject, wherein the subject is a mammal, and preferably the subject is a human.

In one embodiment of the present invention, it discloses a use of the pharmaceutical composition to prevent transmission of severe acute respiratory syndrome coronavirus 2 (SARS-CoV-2) as disclosed herein for treating or preventing SAR-CoV-2 infection in a subject against COVID-19 comprising administering to the subject a therapeutically effective amount of one or more genetically modified bacteria.

In another embodiment of the present invention, it discloses the use of the pharmaceutical composition to prevent transmission of severe acute respiratory syndrome coronavirus 2 (SARS-CoV-2) for treating or preventing SAR-CoV-2 infection in a subject against COVID-19, wherein the therapeutically effective amount of one or more genetically modified bacteria is administered as an oral vaccine to prevent transmission of SARS-COV-2 or a nasal spray vaccine to prevent transmission of SARS-COV-2.

In another embodiment of the present invention, it discloses the use of the pharmaceutical composition to prevent transmission of severe acute respiratory syndrome coronavirus 2 (SARS-CoV-2) for treating or preventing SAR-CoV-2 infection in a subject against COVID-19-, wherein the subject is a mammal, and preferably the subject is a human.

In one embodiment of the present invention, it discloses a use of the pharmaceutical composition to prevent transmission of severe acute respiratory syndrome coronavirus 2 (SARS-CoV-2) as disclosed herein for blocking SAR-CoV-2 virus entry in a subject comprising administering to the subject a therapeutically effective amount of one or more genetically modified bacteria.

In another embodiment of the present invention, it discloses the use of the pharmaceutical composition to prevent transmission of severe acute respiratory syndrome coronavirus 2 (SARS-CoV-2) as disclosed herein for blocking SAR-CoV-2 virus entry in a subject, wherein the therapeutically effective amount of one or more genetically modified bacteria is administered as an oral vaccine to prevent transmission of SARS-COV-2 or a nasal spray vaccine to prevent transmission of SARS-COV-2.

In another embodiment of the present invention, it discloses the use of the pharmaceutical composition to prevent transmission of severe acute respiratory syndrome coronavirus 2 (SARS-CoV-2) as disclosed herein for blocking SAR-CoV-2 virus entry in a subject, wherein the subject is a mammal, and preferably the subject is a human.

The invention will be further explained by the following Examples, which are intended to purely exemplary of the invention, and should not be considered as limiting the invention in any way.

Example 1

Assay for small peptide expression at a therapeutically effective concentration from the genetically modified oral bacterial cells: An experiment will be carried out as shown in FIG. 4 with genes encoding the designed protein sequences of small peptides of the present disclosure as set forth in SEQ ID NO: 1 to SEQ ID NO: 10 as shown in FIG. 3 to synthesize said small peptides by first cloning the corresponding nucleotide sequences for the aforementioned amino acid sequences for small peptides into modified pET-29b(+) *E. coli* plasmid expression vectors (GenScript, N-terminal 8×His-tagged followed by a TEV cleavage site) as shown in the reference Cao et al. The aforementioned plasmids so obtained will then be transformed into *Staphylococcus lugdunensis* and/or *Streptococcus salivarius* M18 and then the protein expression of the small peptides the group consisting of sequences as set forth in SEQ ID NO: 1 to SEQ ID NO: 10 which encode peptides AHB1, AHB2, and LCB1 to LCB8, respectively will be induced appropriately. The genetically modified *Staphylococcus lugdunensis* and/or *Streptococcus salivarius* M18 cells will then be harvested by spinning at 4,000×g for 10 min and then resuspended in lysis buffer (300 mM NaCl, 30 mM Tris-HCL, pH 8.0, with 0.25% CHAPS for cell assay samples) with DNAse and protease inhibitor tablets. The cells will then be lysed with a QSONICA SONICATORS sonicator for 4 minutes total (2 minutes on time, 10 sec on-10 sec off) with an amplitude of 80%. Then the soluble fraction will be clarified by centrifugation at 20,000 g for 30 min. The soluble fraction will then be purified by Immobilized Metal Affinity Chromatography (Qiagen) followed by FPLC size-exclusion chromatography (Superdex 75 10/300 GL, GE Healthcare). All protein samples will then be characterized with SDS-PAGE with the purity higher than 95%. Protein concentrations will then be determined by absorbance at 280 nm measured using a NanoDrop spectrophotometer (Thermo Scientific) using predicted extinction coefficients.

Example 2

In vitro experiment to demonstrate the genetically modified *Staphylococcus lugdunensis* and/or *Streptococcus salivarius* M18 transcribed, translated, and emitted sequences of small peptides are effective in causing down-regulation of infection of cultured human Vero cells as measured with a SARS-CoV-2 neutralization assay: As illustrated in the flow-chart of FIG. 5, appropriate SARS-CoV-2 strain will be obtained for performing this assay where, virus stocks will be produced in Vero CCL81 cells (ATCC) and titrated by focus-forming assay on Vero E6 cells. Serial dilutions of genetically modified *Staphylococcus lugdunensis* and/or *Streptococcus salivarius* M18 expressing, transcribing, translating, and emitting sequences of small peptides as set forth in SEQ ID NO: 1 to SEQ ID NO: 10 as shown in FIG. 3 of the present disclosure will be incubated with $10^2$ focus-forming units (FFU) of SARS-CoV-2 for 1 h at 37° C. RBD binder-virus complexes will be added to Vero E6 cell monolayers in 96-well plates and incubated for 1 h at 37° C. Next, cells will be overlaid with 1% (w/v) methylcellulose in MEM supplemented to contain 2% FBS. Plates will then be harvested 30 h later by removing overlays and fixing them with 4% PFA in PBS for 20 min at room temperature. Plates will then be washed and sequentially incubated with 1 µg/mL of CR3022 (5) anti-S antibody and HRP-conjugated goat anti-human IgG in PBS supplemented to contain 0.1% saponin and 0.1% BSA. SARS-CoV-2-infected cell foci will then be visualized using TrueBlue peroxidase substrate (KPL) and quantitated on an ImmunoSpot microanalyzer (Cellular Technologies). Data will be processed using Prism software (GraphPad Prism 8.0).

Example 3

Experiment to demonstrate the use of the pharmaceutical composition of the vaccine of the present disclosure comprising: genetically modified *Staphylococcus lugdunensis* and/or *Streptococcus salivarius* M18 bacteria expressing, transcribing, translating, and emitting sequences of small peptides as set forth in SEQ ID NO: 1 to SEQ ID NO: 10 as shown in FIG. 3 of the present disclosure, along with pharmaceutical excipients for use as a nasal spray in hamsters as well as transgenic mice will be carried to demonstrate the attenuation of SARS-CoV-2 infection with the said vaccine of the present disclosure. Similarly, additional experiments will be carried out to demonstrated even the prevention of SARS-CoV-2 infection in the first place by the orally as well as nasally administered vaccine of the present disclosure. Additional Experiments will be carried out to determine the most appropriate and effective the range of concentrations of the 2 elements in the combination in the oral and/or nasal vaccine, namely the genetically modified bacteria and the sequence of small peptides expressed and emitted therefrom for use as an effective oral and/or nasal vaccine based on the present disclosure.

It will be apparent to those skilled in the art that various modifications and variations can be made in the practice of the present invention without departing from the scope or spirit of the invention. Other embodiments of the invention will be apparent to those skilled in the art from considering of the specification and practice of the invention. It is intended that the specification and examples be considered as exemplary only, with a true scope and spirit of the invention being indicated by the following claims.

Although the invention has been explained in relation to its preferred embodiment, it is to be understood that many other possible modifications and variations can be made without departing from the spirit and scope of the invention as hereinafter claimed.

REFERENCES

1. A. Chevalier et al., Nature, 2017, 550, 74-79.
2. Cao et al., Science. 2020, 370, 426-431.
3. Maiti B. K., ACS Pharmacol. Transl. Sci., 2020, 3, 783-785.
4. Chitsike and Duerksen-Hughes, Virol J. 2021, 18:154.

---

SEQUENCE LISTING

```
Sequence total quantity: 10
SEQ ID NO: 1            moltype = AA  length = 84
FEATURE                 Location/Qualifiers
source                  1..84
                        mol_type = protein
                        organism = synthetic construct
SEQUENCE: 1
DEDLEELERL YRKAEEVAKE AKDASRRGDD ERAKEQMERA MRLDQVFELA QELQEKQTDG   60
NRQKATHLDK AVKEAADELY QRVR                                         84

SEQ ID NO: 2            moltype = AA  length = 75
FEATURE                 Location/Qualifiers
source                  1..75
                        mol_type = protein
                        organism = synthetic construct
SEQUENCE: 2
ELEEQVMHVL DQVSELAHEL LHKLTGEELE RAAYFNWWAT EMMLELIKSD DEREIREIEE   60
EARRILEHLE ELARK                                                   75

SEQ ID NO: 3            moltype = AA  length = 56
FEATURE                 Location/Qualifiers
source                  1..56
                        mol_type = protein
                        organism = synthetic construct
SEQUENCE: 3
DKEWILQKIY EIMRLLDELG HAEASMRVSD LIYEFMKKGD ERLLEEAERL LEEVER       56
```

```
SEQ ID NO: 4            moltype = AA  length = 56
FEATURE                 Location/Qualifiers
source                  1..56
                        mol_type = protein
                        organism = synthetic construct
SEQUENCE: 4
SDDEDSVRYL LYMAELRYEQ GNPEKAKKIL EMAEFIAKRN NNEELERLVR EVKKRL        56

SEQ ID NO: 5            moltype = AA  length = 64
FEATURE                 Location/Qualifiers
source                  1..64
                        mol_type = protein
                        organism = synthetic construct
SEQUENCE: 5
NDDELHMLMT DLVYEALHFA KDEEIKKRVF QLFELADKAY KNNDRQKLEK VVEELKELLE    60
RLLS                                                                 64

SEQ ID NO: 6            moltype = AA  length = 56
FEATURE                 Location/Qualifiers
source                  1..56
                        mol_type = protein
                        organism = synthetic construct
SEQUENCE: 6
QREKRLKQLE MLLEYAIERN DPYLMFDVAV EMLRLAEENN DERIIERAKR ILEEYE        56

SEQ ID NO: 7            moltype = AA  length = 65
FEATURE                 Location/Qualifiers
source                  1..65
                        mol_type = protein
                        organism = synthetic construct
SEQUENCE: 7
SLEELKEQVK ELKKELSPEM RRLIEEALRF LEEGNPAMAM MVLSDLVYQL GDPRVIDLYM    60
LVTKT                                                                65

SEQ ID NO: 8            moltype = AA  length = 56
FEATURE                 Location/Qualifiers
source                  1..56
                        mol_type = protein
                        organism = synthetic construct
SEQUENCE: 8
DREQRLVRFL VRLASKFNLS PEQILQLFEV LEELLERGVS EEEIRKQLEE VAKELG        56

SEQ ID NO: 9            moltype = AA  length = 57
FEATURE                 Location/Qualifiers
source                  1..57
                        mol_type = protein
                        organism = synthetic construct
SEQUENCE: 9
DDDIRYLIYM AKLRLEQGNP EEAEKVLEMA RFLAERLGME ELLKEVRELL RKIEELR       57

SEQ ID NO: 10           moltype = AA  length = 65
FEATURE                 Location/Qualifiers
source                  1..65
                        mol_type = protein
                        organism = synthetic construct
SEQUENCE: 10
PIIELLREAK EKNDEFAISD ALYLVNELLQ RTGDPRLEEV LYLIWRALKE KDPRLLDRAI    60
ELFER                                                                65
```

What is claimed is:

1. A pharmaceutical composition to prevent transmission of a pathogen, the pharmaceutical composition comprising:
   a) genetically modified commensal bacteria capable of colonizing an oral and/or nasal mucosa of a subject; and
   b) pharmaceutical excipients,
   wherein the genetically modified commensal bacteria are from mouth and/or nose commensal bacteria modified by transgenic technology to comprise genes encoding small peptides, such that the bacteria transcribe, translate, produce, and secrete the small peptides expressed in situ at the oral and/or nasal mucosa of the subject and which neutralize the pathogen,
   wherein the small peptides are selected from the group consisting of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, and SEQ ID NO: 10,
   wherein the transgenic technology is used to modify commensal bacteria to produce transgenic bacteria to obtain the genetically modified commensal bacteria by introducing a recombinant vector into the commensal bacteria, the recombinant vector comprising genes encoding the small peptides inserted into a vector to add said genes that are transcribed and translated for recombinant expression in the genetically modified commensal bacteria to produce and secrete the small peptides from the genetically modified commensal bacteria in situ at the oral and/or nasal mucosa, wherein the genetically modified commensal bacteria deliver the small peptides in situ at the oral and/or nasal mucosa of the subject, wherein the subject is a mammal, wherein the pathogen is a coronavirus, wherein the coronavirus comprises severe acute respiratory syndrome coronavirus 2 (SARS-CoV-2), wherein the pharmaceutical excipients comprise stabilizers, buffers, cryoprotectants, or other agents formulated to aid the oral and/or nasal administration of the pharmaceutical composition, and wherein the genetically modified commensal bacteria carrying the added genes encoding the small peptides provide an effective and easy administration by means of an easy-to-administer pharmaceutical composition for neutralization of the pathogen to prevent transmission of the pathogen in situ at the oral and/or nasal mucosa of the subject.

2. The pharmaceutical composition of claim 1, wherein the genetically modified commensal bacteria are obtained from *Staphylococcus lugdunensis*, genetically modified with the use of transgenic technology.

3. The pharmaceutical composition of claim 1, wherein the pharmaceutical composition is formulated as an oral vaccine to prevent transmission of the pathogen in situ at the oral mucosa of the subject, or a nasal spray vaccine to prevent transmission of the pathogen in situ at the nasal mucosa of the subject.

4. The pharmaceutical composition of claim 1, wherein one or more of the small peptides are modified with extra n-glycosylation sites to improve half-life.

5. A method of treating or preventing infection of a pathogen in a subject, the method comprising the step of administering a therapeutically effective amount of the pharmaceutical composition of claim 1 to the subject.

6. The method of claim 5, wherein the the pharmaceutical composition of claim 1 is administered as an oral vaccine to prevent transmission of the pathogen or a nasal spray vaccine to prevent transmission of the pathogen.

7. The method of claim 5, wherein the subject is a mammal.

8. A method of blocking entry of a pathogen in a subject comprising the step of administering a therapeutically effective amount of the pharmaceutical composition of claim 1 to the subject.

9. The method of claim 8, wherein the the pharmaceutical composition of claim 1 is administered as an oral vaccine to prevent transmission of the pathogen or a nasal spray vaccine to prevent transmission of the pathogen.

10. The method of claim 8, wherein the subject is a mammal.

11. The pharmaceutical composition of claim 1, wherein the small peptides disrupt and/or block the interaction and binding of the pathogen and/or proteins of the pathogen with host receptors at the oral and/or nasal mucosal surface of the subject owing to the production and secretion of the small peptides in situ in the mouth and nose of the subject to prevent pathogen attachment and entry into the host cells to prevent the transmission of the pathogen at the initial stage of interaction at the mouth and/or nose of the subject exposed to the pathogen, and this leads to prevention of acquisition of infection, prevention of morbidities caused by infection from the pathogen, and prevention of death caused by said infection.

* * * * *